US011501778B2

(12) United States Patent
Boettger et al.

(10) Patent No.: US 11,501,778 B2
(45) Date of Patent: Nov. 15, 2022

(54) ELECTRONIC ASSISTANCE DEVICE AND OPERATIONAL METHOD

(71) Applicant: Deutsche Telekom AG, Bonn (DE)

(72) Inventors: Dirk A. Boettger, Wachtberg (DE); Henning Ralf, Wesseling (DE); Mirko Knoll, Roedermark (DE); Bernhard Hochstaetter, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 129 days.

(21) Appl. No.: 17/173,217

(22) Filed: Feb. 11, 2021

(65) Prior Publication Data

US 2021/0256974 A1   Aug. 19, 2021

(30) Foreign Application Priority Data

Feb. 13, 2020  (EP) .................................... 20157073

(51) Int. Cl.
| | | |
|---|---|---|
| *G10L 15/22* | (2006.01) | |
| *G06F 3/16* | (2006.01) | |
| *G10L 15/08* | (2006.01) | |
| *G10L 15/30* | (2013.01) | |

(52) U.S. Cl.
CPC .............. *G10L 15/22* (2013.01); *G06F 3/165* (2013.01); *G06F 3/167* (2013.01); *G10L 15/08* (2013.01); *G10L 15/30* (2013.01); *G10L 2015/088* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | |
|---|---|---|---|
| 8,843,057 B2 * | 9/2014 | Atsmon ................ | G07F 7/1008 |
| | | | 455/3.06 |
| 9,368,105 B1 * | 6/2016 | Freed ....................... | G10L 15/22 |
| 9,857,015 B2 * | 1/2018 | Kiest, Jr. ................ | F16L 55/179 |
| 10,573,312 B1 * | 2/2020 | Thomson ............... | G10L 15/187 |
| 10,685,669 B1 * | 6/2020 | Lan ....................... | G10L 15/1822 |

(Continued)

FOREIGN PATENT DOCUMENTS

| | | |
|---|---|---|
| WO | WO 2016057268 A1 | 4/2016 |
| WO | WO 2017217978 A1 | 12/2017 |

*Primary Examiner* — Marcus T Riley

(74) *Attorney, Agent, or Firm* — Leydig, Voit & Mayer, Ltd.

(57) ABSTRACT

A method for operating an electronic assistance device includes: outputting, at a foreground volume, a first output audio stream provided by a voice-controlled first assistance application of the electronic assistance device, the first assistance application exclusively accepting a first wake-up word; continuously detecting an ambient sound and providing the detected ambient sound as an input audio stream; recognizing a second wake-up word as the only wake-up word in a user's voice input recognized in the provided input audio stream, wherein the second wake-up word is exclusively accepted by a voice-controlled second assistance application of the assistance device; and recognizing, in the voice input a command word following the second wake-up word, the command word being accepted by the first assistance application and by the second assistance application, and controlling the first output audio stream via the recognized voice input.

14 Claims, 1 Drawing Sheet

(56) References Cited

U.S. PATENT DOCUMENTS

| | | | |
|---|---|---|---|
| 10,719,115 B2* | 7/2020 | Zopf | G06F 1/3231 |
| 10,777,195 B2* | 9/2020 | Fox | G10L 15/08 |
| 10,867,601 B2* | 12/2020 | Bulpin | G10L 15/30 |
| 10,971,153 B2* | 4/2021 | Thomson | G10L 15/187 |
| 11,017,778 B1* | 5/2021 | Thomson | H04M 3/42382 |
| 11,032,630 B2* | 6/2021 | Stanford-Jason | G10L 21/0208 |
| 11,145,312 B2* | 10/2021 | Thomson | G10L 15/26 |
| 11,264,049 B2* | 3/2022 | Zopf | G10L 15/22 |
| 11,295,744 B2* | 4/2022 | Bourgoin | H04N 21/4394 |
| 11,322,148 B2* | 5/2022 | Yoshioka | G10L 15/083 |
| 11,380,312 B1* | 7/2022 | Mansour | G10L 25/84 |
| 2010/0109918 A1* | 5/2010 | Liebermann | G10L 13/00 |
| | | | 340/936 |
| 2010/0256976 A1* | 10/2010 | Atsmon | G06Q 30/0207 |
| | | | 704/E15.001 |
| 2016/0189706 A1* | 6/2016 | Zopf | G10L 15/063 |
| | | | 704/254 |
| 2019/0221209 A1* | 7/2019 | Bulpin | G10L 15/08 |
| 2019/0237069 A1* | 8/2019 | Zhao | G06F 40/55 |
| 2019/0297407 A1* | 9/2019 | Stanford-Jason | H04R 1/083 |
| 2019/0371310 A1* | 12/2019 | Fox | G10L 15/26 |
| 2020/0380988 A1* | 12/2020 | Bourgoin | G06F 3/167 |
| 2021/0067854 A1* | 3/2021 | Stanford-Jason | G10L 15/22 |
| 2021/0090568 A1* | 3/2021 | Bulpin | G06F 3/167 |
| 2021/0256974 A1* | 8/2021 | Boettger | G10L 15/30 |
| 2021/0295838 A1* | 9/2021 | Kwon | G10L 15/30 |
| 2022/0044670 A1* | 2/2022 | Shim | H04R 29/005 |
| 2022/0104015 A1* | 3/2022 | McDevitt | H04N 21/43615 |

* cited by examiner

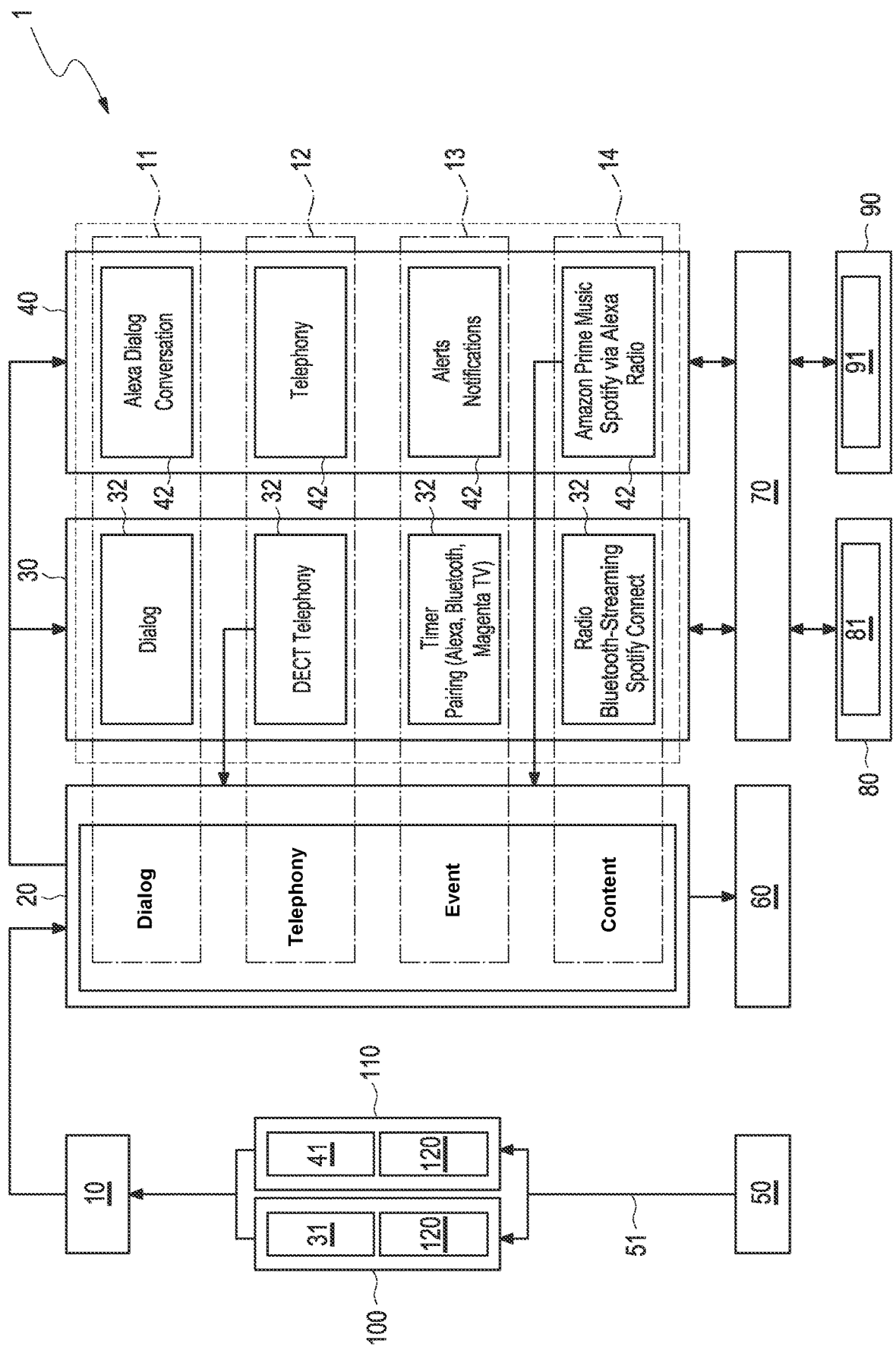

ELECTRONIC ASSISTANCE DEVICE AND OPERATIONAL METHOD

CROSS-REFERENCE TO PRIOR APPLICATIONS

Priority is claimed to European Patent Application No. EP 20 157 073.6, filed on Feb. 13, 2020, the entire disclosure of which is hereby incorporated by reference herein.

FIELD

The invention relates to a method of operating an electronic assistance device, wherein a loudspeaker of the electronic assistance device outputs at a foreground volume a first output audio stream provided by a voice-controlled first assistance application of the assistance device, the first assistance application exclusively accepting a first wake-up word, wherein a microphone of the electronic assistance device continuously detects an ambient sound and provides the detected ambient sound as an input audio stream, and wherein a voice-controlled wake-up module of the assistance device recognizes as the only wake-up word in a user's voice input recognized in the provided input audio stream a second wake-up word exclusively accepted by a voice-controlled second assistance application of the assistance device, the second assistance application being different from the first assistance application. Furthermore, the invention relates to an electronic assistance device and a computer program product for an electronic assistance device.

BACKGROUND

Electronic assistance devices, or assistance devices for short, are known from prior art in various embodiments and serve to output audio streams, for example to play pieces of music. Electronic assistance devices include dedicated devices, which are commonly referred to as smart speakers or intelligent personal assistants (IPA), as well as universal mobile user equipment (UE), such as smartphones and tablets.

An electronic assistance device usually comprises a voice-controlled assistance application, or assistance application for short, which is installed in the electronic assistance device as software and provides an output audio stream or a plurality of output audio streams when executed by the electronic assistance device. Examples of voice-controlled assistance applications include Amazon Alexa, Apple Siri, Google Assistant and Telekom Magenta. Typically, the voice-controlled assistance application includes a voice user interface (VUI) and a backend connected to the voice user interface. For example, the voice user interface and backend of Amazon Alexa are referred to as AVS (Amazon Voice Services) and Amazon AVS Cloud, respectively, and those of Telekom Magenta are referred to as CVI (Common Voice Interface) and Magenta Voice Cloud, respectively.

The voice-controlled assistance application accepts a uniquely defined wake-up word (WUW). For example, Amazon Alexa, Apple Siri, Google Assistant and Telekom Magenta accept the wake-up words "Alexa", "Siri", "Ok google" and "Hello Magenta", respectively. A user can wake up the voice-controlled assistance application at any time by a voice input comprising the accepted wake-up word, i.e., by saying the wake-up word.

Furthermore, the voice-controlled assistance application accepts a plurality of command words. For example, accepted command words include "Stop", "Play", "Pause", "Resume", "Next Track", "Previous Track", "Seek Forward", "Seek Backward", "Turn up the volume", "Turn down the volume" and "Mute". The user can control, i.e., actuate, the voice-controlled assistance application by a voice input comprising an accepted command word, i.e., by saying a command word.

Typically, the user controls the electronic assistance device by a voice input comprising an accepted wake-up word and at least one accepted command word following the wake-up word. A wake-up word or command word is considered accepted if the voice-controlled assistance application defines the wake-up word or command word and recognizes it in the user's voice input.

The voice-controlled assistance application provides a plurality of output audio streams. For example, Telekom Magenta provides the output audio streams Dialog, DECT Telephony, Timer, Pairing, Radio, Bluetooth Streaming, Spotify Connect and Amazon Alexa provides the output audio streams Alexa Dialog, Conversation, Telephony, Alerts, Notifications, Amazon Prime Music, Spotify via Alexa, Radio.

If an assistance device comprises two or more voice-controlled assistance applications and outputs an output audio stream provided by a voice-controlled first assistance application, a user voice input for controlling the output audio stream may comprise a command word accepted by the voice-controlled first assistance application, but erroneously comprise a wake-up word accepted by a voice-controlled further assistance application, however, not accepted by the voice-controlled first assistance application.

Such erroneous voice input is consistently ignored by the electronic assistance device and, thus, does not control the electronic assistance device. However, the absence of the control effect causes strong frustration in the user, especially after several unsuccessful voice inputs, which is accompanied by the user's great dissatisfaction with the electronic assistance device.

SUMMARY

In an exemplary embodiment, the present invention provides a method for operating an electronic assistance device. The method includes: outputting, by a loudspeaker of the electronic assistance device, at a foreground volume, a first output audio stream provided by a voice-controlled first assistance application of the electronic assistance device, the first assistance application exclusively accepting a first wake-up word; continuously detecting, by a microphone of the electronic assistance device, an ambient sound and providing the detected ambient sound as an input audio stream; recognizing, by the electronic assistance device, a second wake-up word as the only wake-up word in a user's voice input recognized in the provided input audio stream, wherein the second wake-up word is exclusively accepted by a voice-controlled second assistance application of the assistance device, the second assistance application being different from the first assistance application; and recognizing, by the electronic assistance device, in the voice input a command word following the second wake-up word, the command word being accepted by the first assistance application and by the second assistance application, and controlling the first output audio stream via the recognized voice input.

BRIEF DESCRIPTION OF THE DRAWINGS

Embodiments of the present invention will be described in even greater detail below based on the exemplary FIG- URES. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 shows a block diagram of an electronic assistance device in an embodiment according to the present invention.

DETAILED DESCRIPTION

In an exemplary embodiment, the invention provides a method for operating an electronic assistance device, wherein a user can control the electronic assistance device as expected even when erroneously using an incorrect voice input. In further exemplary embodiments, the invention provides an electronic assistance device and a computer program product for an electronic assistance device.

In an exemplary embodiment, the invention provides a method of operating an electronic assistance device, wherein a loudspeaker of the electronic assistance device outputs at a foreground volume a first output audio stream provided by a voice-controlled first assistance application of the assistance device, the first assistance application exclusively accepting a first wake-up word, a microphone of the electronic assistance device continuously detects an ambient sound and provides the detected ambient sound as an input audio stream, and a voice-controlled wake-up module of the assistance device recognizes as the only wake-up word in a user's voice input detected in the provided input audio stream a second wake-up word exclusively accepted by a voice-controlled second assistance application of the assistance device, the second assistance application being different from the first assistance application.

The method is used to operate an electronic assistance device which comprises two assistance applications. The terms "first" and "second" do not establish a sequential order and may be interchanged universally without changing the object of the invention. Rather, the terms "first" and "second" serve to distinguish the two separate and distinct assistance applications. Thus, it is contrary to the nature of the invention to consider the first assistance application and the second assistance application as different names of the same assistance application or as two separate instances of the same assistance application.

The invention is not limited to two assistance applications. Rather, the electronic assistance device may also comprise three or more than three assistance applications.

The input audio stream is continuously provided by the microphone and comprises any voice input from the user while the user is located within a detection range of the microphone. A user's voice input for controlling the electronic assistance device comprises a wake-up word accepted by an assistance application of the assistance device and a command word accepted by the assistance application following the wake-up word. The voice input is a section of the input audio stream. The wake-up word and the command word are consecutive sections of the voice input.

The output audio stream is output from the loudspeaker at the foreground volume and may comprise, for example, a radio program provided by an assistance application. The user starts an output of an output audio stream via a voice input. A started output audio stream may be referred to as an activity of the electronic assistance device. The activity continues until the output audio stream is stopped. A started output audio stream has not yet been stopped.

The foreground volume is a user-determined volume of the electronic assistance device. The foreground volume is thus 100% of the volume of the electronic assistance device. Preferably, the user adjusts the volume of the electronic assistance device at any time via voice input.

The command word accepted by the first assistance application and the second assistance application may be referred to as a universal command word. In addition to the universal command words, the first assistance application may accept other command words that are not accepted by the second assistance application, and vice versa. A command word accepted exclusively by either the first assistance application or the second assistance application may be referred to as a special command word.

The universal command words considered here are follow-up command words which require a started output audio stream. Follow-up command words include a stop command word for stopping the started output audio stream, and in particular at least one setting command word for changing a state of the output audio stream.

If the user wants to control the output audio stream and forgets which of the two assistance applications he or she used to start the output audio stream, the user's corresponding voice input may erroneously comprise the wake-up word accepted by the other assistance application, said word being incompatible with the output audio stream.

According to the invention, a control module of the electronic assistance device recognizes in the voice input a command word following the second wake-up word, said command word being accepted by the first assistance application and by the second assistance application, and controls the first output audio stream using the recognized voice input. In other words, the control module ignores the second wake-up word, which is not accepted by the first assistance application. Instead, the control module wakes up the first assistance application and forwards the end portion of the voice input, which follows the second wake-up word and comprises the universal command word, to the first assistance application, more specifically to a voice user interface (VUI) of the first assistance application. The first assistance application changes a state of the first output audio stream according to the universal command word.

The operational method according to the invention allows the user to achieve the intended control effect also via an incompatible wake-up word. The operational method according to the invention assumes that the user wants to use the universal command word to control the audio stream output being output at the foreground volume, i.e., to change a state or characteristic of the output audio stream. In short, in the case of a universal command word, the electronic assistance device understands the user's voice input to be related to the audio stream output being output at the foreground volume.

It is noted that the control effect intended by the user is of course also achieved via the compatible wake-up word in a known operational method of the electronic assistance device.

In a preferred embodiment, out of at least two started first and second output audio streams each associated exclusively with one channel out of two or more than two channels defined by the control module, the control module directs that output audio stream to the loudspeaker for output at the foreground volume whose channel has a highest priority among all channels with at least one started output audio stream and which has been started as the last output audio stream among the started output audio streams of that channel. Started output audio streams associated with a channel can be provided by the first assistance application or the second assistance application, i.e., the channel association of the started output audio streams is independent of the assistance application providing the output audio stream. Each output audio stream started is exclusively associated with one channel.

In short, the control module first determines all channels with at least one started output audio stream. A channel with at least one started output audio stream may be referred to as an active channel. Among the active channels, the control module then determines the channel with the highest priority. The control module directs the last-started output audio stream of the active channel with the highest priority to the loudspeaker at a foreground volume. As a result, at most one output audio stream is output at the foreground volume.

In an advantageous embodiment, out of at least two started first and second output audio streams each associated exclusively with one channel out of two or more than two channels defined by the control module, the control module directs that output audio stream to the loudspeaker for output at the background volume whose channel has a second highest priority among all channels with at least one started output audio stream and which has been started as the last output audio stream among the started output audio streams of that channel. Here the control module determines the channel with the second highest priority among the active channels and directs the last-started output audio stream of the active channel with the second highest priority to the loudspeaker at a background volume. As a result, at the most, one output audio stream is output at the background volume.

The background volume is lower than the foreground volume and is, for example, 10% of the volume of the electronic assistance device. Accordingly, the loudspeaker outputs two output audio streams simultaneously at different volumes. As a result of the different volume levels, the cognition of the output audio stream being output at the foreground volume is not disturbed, or at least not significantly disturbed, by the output audio stream being output at the background volume.

Ideally, out of at least two started first and second output audio streams each associated exclusively with one channel out of two or more than two channels defined by the control module, the control module directs that output audio stream to the loudspeaker for output at a zero volume whose channel has at most a third highest priority among all channels with at least one started output audio stream and which has been started as the last output audio stream among the started output audio streams of that channel. The zero volume is 0% of the volume of the electronic assistance device. In this way, last-started output audio streams of active channels with a priority lower than the highest priority and the second highest priority are muted. In this way, the cognition of the output audio stream being output at the foreground volume or the output audio stream being output at the background volume is not disturbed.

The control module may manage in a LIFO stack all started first and second output audio streams associated exclusively with one channel out of two or more than two channels defined by the control module. Each active channel may include a plurality of started first and second output audio streams. The LIFO (Last In First Out) stack comprises a plurality of positions, which are numbered consecutively, starting with one. The output audio stream started last is at position one, the output audio stream started second last is at position two, and so on. When the output audio stream started last is stopped, the output audio stream started second last becomes the output audio stream started last and advances to position one. Other output audio streams managed in the LIFO stack also move up one position. In contrast, a newly started output audio stream not yet managed in the LIFO stack becomes the output audio stream started last and is assigned position one. The previous output audio stream started last becomes the output audio stream started second last and moves back to position two. Other output audio streams managed in the LIFO stack also move back one position.

In further embodiments, a communication module of the assistance device receives an output audio stream provided by an assistance application from a backend of the assistance application arranged on an external network. Preferably, the Internet serves as the external network. The backend is advantageously arranged in an internet cloud. For example, the output audio stream is provided by a streaming service in the internet cloud. Streaming services include internet radio, audio-on-demand services, music subscription services, live streaming services and the like.

In another exemplary embodiment, the invention provides an electronic assistance device comprising a voice-controlled first assistance application exclusively accepting a first wake-up word and providing a first output audio stream, a voice-controlled second assistance application different from the voice-controlled first assistance application, the second assistance application exclusively accepting a second wake-up word and providing a second output audio stream, a loudspeaker for outputting the first output audio stream and the second output audio stream, a microphone for continuously detecting an ambient sound and providing the detected ambient sound as an input audio stream, a voice-controlled wake-up module for recognizing the first wake-up word and the second wake-up word in a user's voice input recognized in the provided input audio stream.

According to the invention, the assistance device comprises a control module for recognizing in the recognized voice input a command word accepted by the first assistance application and by the second assistance application and is configured to execute a method according to the invention. The control module recognizes a universal command word in the user's voice input and behaves as intended by the user if the wake-up word in the voice input is not accepted by an assistance application providing an output audio stream output in the foreground, i.e. if it is incompatible with the providing assistance application.

Ideally, the control module defines two or more than two channels having different priorities and each comprising a plurality of first and second output audio streams, each associated exclusively with one channel out of the two or more than two channels. The association of an output audio stream with a channel is constant, regardless of its respective current state. The output audio stream remains associated with the channel as a stopped output audio stream and a started output audio stream. The two or more channels are disjoint with respect to the output audio streams. The different priorities imply a sequential order of channels. The defined channels form an order of the first and second output audio streams, the order encompassing the first assistance application and the second assistance application. The control module comprises control logic corresponding to the order, which enables simultaneous execution of the first assistance application and the second assistance application.

Advantageously, each defined channel comprises a plurality of similar output audio streams. The similar output audio streams each have similar states and thus can be controlled in a similar manner with respect to the similar states. In contrast, different channels each comprise dissimilar output audio streams. The control logic of the control module may thus comprise specific channel controls. Moreover, in this way, the control logic of the control module can easily ensure that similar output audio streams are not output simultaneously.

In a preferred embodiment, the control module defines four channels comprising a dialogue channel having a highest priority, a telephony channel having a second highest priority, an event channel having a second lowest priority, and a content channel having a lowest priority. These four channels are sufficient to put the first and second output audio streams of the first assistance application and second assistance application in an order according to their similarity and dissimilarity.

In many embodiments, the control module defines for each defined channel a command group with command words accepted by the first assistance application and the second assistance application. The channel-specific command group comprises universal command words which achieve an identical control effect with respect to the first assistance application and the second assistance application. The channel-specific command group makes it easier for the control module to recognize a universal command word.

In further embodiments, the control module defines for each output audio stream a transition table which associates with each possible state of the output audio stream one or more command words compatible with such state. The transition table allows the control module to decide whether a command word of the voice input matches a current state of the output audio stream and the intended change of state is possible. If the command word of the voice input is incompatible with the current state of the output audio stream to be controlled, the control module can refrain from forwarding the voice input.

Ideally, the assistance device comprises a communication module for receiving an output audio stream from a backend of the assistance application arranged on an external network. The communication module enables the assistance device to access external resources, which are arranged in an internet cloud, for example. A voice interface of the assistance application and the backend may be arranged in the internet cloud. The backend can provide the output audio stream for the assistance application.

In yet another exemplary embodiment, the invention provides a computer program product for an electronic assistance device, said product comprising a storage medium readable by an electronic assistance device and having program code stored on the storage medium and executable by the electronic assistance device. The storage medium allows for installing the program code on the electronic assistance device or for the electronic assistance device to access the program code in any known manner. The computer program product is used to set up or configure the electronic assistance device.

According to the invention, the program code causes the electronic assistance device to perform a method according to the invention when being executed by a processor of the electronic assistance device. The program code causes the electronic assistance device to become the electronic assistance device according to the invention.

Further advantages and embodiments of the invention follow from the description and the accompanying drawing.

It is understood that the features mentioned above and those still to be explained below are not limited to the respective combination indicated, but may also be used in other combinations or on their own, without departing from the scope of the present invention.

FIG. 1 shows a block diagram of an electronic assistance device 1 in an embodiment according to the present invention. The electronic assistance device 1 comprises a voice-controlled first assistance application 30 exclusively accepting a first wake-up word 31 and providing a first output audio stream 32, and a voice-controlled second assistance application 40 different from the voice-controlled first assistance application 30, the second assistance application 40 exclusively accepting a second wake-up word 41 and providing a second output audio stream 42.

As an example, the first assistance application 30 is Telekom Magenta and the second assistance application 40 is Amazon Alexa. In the example, Telekom Magenta and Amazon Alexa only accept the first wake-up word 31 "Hello Magenta" and the second wake-up word 41 "Alexa", respectively.

The electronic assistance device 1 also comprises a communication module 70 for receiving an output audio stream 32, 42 from a first or second backend 80, 90 of the assistance application 30, 40, the backends 80, 90 being arranged on an external network. The first and second voice interfaces (VUI) 81, 91, in the example CVI and AVS, of the two assistance applications 30, 40 are each at least partially comprised by the first backend 80 and by the second backend 90, respectively, in the example Magenta Voice Cloud and Amazon AVS Cloud.

Further, the electronic assistance device 1 comprises a loudspeaker 60 for outputting the first output audio stream 32 and the second output audio stream 42, and a microphone 50 for continuously detecting an ambient sound and providing the detected ambient sound as an input audio stream 51.

The electronic assistance device further includes a voice-controlled wake-up module 10 for recognizing the first wake-up word 31 and the second wake-up word 41 in a user's voice input 100 recognized in the provided input audio stream 51, and a control module 20 for recognizing a command word 120 accepted by the first assistance application 30 and by the second assistance application 40 in the recognized voice input 100.

The control module 20 defines two or more than two—here by way of example four channels 11, 12, 13, 14—which have different priorities and each comprise a plurality of in particular similar first and second output audio streams 32, 42. Each output audio stream 32, 42 is exclusively associated with one channel 11, 12, 13, 14 of the two or more than two channels 11, 12, 13, 14, meaning that no output audio stream 32, 42 is associated with two channels 11, 12, 13, 14.

The four channels 11, 12, 13, 14 comprise a dialogue channel 11 having a highest priority, a telephony channel 12 having a second highest priority, an event channel 13 having a second lowest priority and a content channel 14 having a lowest priority. In the example, the dialog channel 11 comprises the output audio stream 32 Dialog provided by Telekom Magenta and the output audio streams 42 Alexa Dialog, Conversation provided by Amazon Alexa. In the example, the telephony channel 12 comprises the output audio stream 32 DECT Telephony provided by Telekom Magenta and the output audio stream 42 Telephony provided by Amazon Alexa. In the example, the event channel 13 comprises the output audio streams 32 Timer, Pairing provided by Telekom Magenta and the output audio streams 42 Alerts, Notifications provided by Amazon Alexa. In the example, the content channel 14 comprises the output audio streams 32 Radio, Bluetooth-Streaming, Spotify Connect provided by Telekom Magenta and the output audio streams 42 Amazon Prime Music, Spotify via Alexa, Radio provided by Amazon Alexa.

The control module 20 further defines for each defined channel 11, 12, 13, 14 a command group comprising command words 120 accepted by the first assistance application 30 and the second assistance application 40, i.e. universal command words. The universal command words for the content channel 14 include, for example, "Stop", "Play", "Pause", "Resume", "Next Track", "Previous Track", "Seek Forward", "Seek Backward", "Turn up the volume", "Turn down the volume" and "Mute". Furthermore, the control module 20 defines for each output audio stream 32, 42 a transition table which associates with each possible state of the output audio stream 32, 42 one or more command words 120 compatible with such state.

The electronic assistance device 1 may be configured via a computer program product. The computer program product comprises a storage medium readable by the electronic assistance device 1 and having program code executable by the electronic assistance device 1 stored on the storage medium. When executed by a processor of the assistance device 1, the program code causes the electronic assistance device 1 to execute the method described below.

The electronic assistance device is configured to operate as follows.

The loudspeaker 60 outputs at a foreground volume a first output audio stream 32 provided by the voice-activated first assistance application 30 exclusively accepting the first wake-up word 31. The microphone 50 continuously detects an ambient sound and provides the detected ambient sound as an input audio stream 51. The input audio stream 51 includes voice inputs 100, 110 from a user.

If the user erroneously says the wake-up word 41 accepted by the second assistance application 40 but not the wake-up word 31 accepted by the first assistance application 30, the voice-controlled wake-up module 10 recognizes the second wake-up word 41 exclusively accepted by the second assistance application 40 of the assistance device 1 as the only wake-up word in a voice input 110 of the user recognized in the provided input audio stream 51 and forwards the voice input 110 to the control module 20.

The control module 20 recognizes in the voice input 110 a command word 120 following the second wake-up word 41, said command word being accepted by the first assistance application 30 and by the second assistance application 40, and controls the first output audio stream 32 using the recognized voice input 110. For this purpose, it wakes up the first assistance application 30 providing the first output audio stream 32 and forwards an end section of the recognized voice input 110, said end section following the second wake-up word 41, to the first assistance application 30.

On the other hand, if the user correctly says the wake-up word 31 accepted by the first assistance application 30, the voice-controlled wake-up module 10 recognizes in the recognized alternative voice input 100 of the user the first wake-up word 31 exclusively accepted by the first assistance application 30 as the only wake-up word. This alternative is part of a known operational method of the electronic assistance device 1.

Out of two started first and second output audio streams 32, 42 each associated exclusively with one channel 12, 14 out of the four channels 11, 12, 13, 14 defined by the control module, the control module 20 directs that output audio stream 32 to the loudspeaker 60 for output at the foreground volume whose channel 12 has the highest priority, here the defined second priority, among all channels 12, 14 with at least one started output audio stream 32, 42 and which has been started as the last output audio stream 32 among the started output audio streams 32, 42 of this channel 12.

Furthermore, out of two started first and second output audio streams 32, 42 each associated exclusively with one channel 12, 14 out of the four channels 11, 12, 13, 14 defined by the control module, the control module 20 directs that output audio stream 42 to the loudspeaker 60 for output at a background volume whose channel 14 has the second highest priority, here the defined lowest priority, among all channels 12, 14 with at least one started output audio stream 32, 42 and which has been started as the last output audio stream 42 among the started output audio streams 32, 42 of this channel 14.

If, other than in the example shown, there is a channel 11, 12, 13, 14 with a third highest priority with which a first or second output audio stream 32, 42 is associated, then, out of three started first and second output audio streams 32, 42 each associated exclusively with one channel 11, 12, 13, 14 out of the four channels 11, 12, 13, 14 defined by the control module 20, the control module 20 directs that output audio stream 32, 42 to the loudspeaker 60 for output at a zero volume whose channel has at most a third highest priority among all channels 11, 12, 13, 14 with at least one started output audio stream 32, 42 and which has been started as the last output audio stream 32, 42 among the started output audio streams of that channel 32, 42.

The control module 20 manages in a LIFO stack all started first and second output audio streams 32, 42 associated exclusively with one channel 11, 12, 13, 14 out of the four channels 11, 12, 13, 14 defined by the control module 20.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOL LIST

1 Electronic assistance device
10 Wake-up module

11 Channel with highest priority, dialog channel
12 Channel with second highest priority, telephony channel
13 Channel with second lowest priority, event channel
14 Channel with lowest priority, content channel
20 Control module
30 First assistance application
31 First wake-up word
32 First output audio stream
40 Second assistance application
41 Second wake-up word
42 Second output audio stream
50 Microphone
51 Input audio stream
60 Loudspeaker
70 Communication module
80 First backend
81 First voice user interface
90 Second backend
91 Second voice user interface
100 First voice input
110 Second voice input
120 Command word

The invention claimed is:

1. A method for operating an electronic assistance device, comprising:
outputting, by a loudspeaker of the electronic assistance device, at a foreground volume, a first output audio stream provided by a voice-controlled first assistance application of the electronic assistance device, the first assistance application exclusively accepting a first wake-up word;
continuously detecting, by a microphone of the electronic assistance device, an ambient sound and providing the detected ambient sound as an input audio stream;
recognizing, by the electronic assistance device, a second wake-up word as an only wake-up word in a user's voice input recognized in the provided input audio stream, wherein the second wake-up word is exclusively accepted by a voice-controlled second assistance application of the electronic assistance device, the second assistance application being different from the first assistance application; and
recognizing, by the electronic assistance device, in the user's voice input a command word following the second wake-up word, the command word being accepted by the first assistance application and by the second assistance application, and controlling the first output audio stream via the recognized user's voice input.

2. The method according to claim 1, wherein at least two channels of the electronic assistance device each respectively correspond to at least one started output audio stream, wherein a respective output audio stream corresponding to a first channel which has a highest priority among all channels with at least one started output audio stream and which has been started as a last output audio stream among the at least one started output audio stream of the first channel is output at the foregoing volume.

3. The method according to claim 2, wherein a respective output audio stream corresponding to a second channel which has a second highest priority among all channels with at least one started output audio stream and which has been started as the last output audio stream among the at least one started output audio stream of the second channel is output at a background volume.

4. The method according to claim 3, wherein a respective output audio stream corresponding to a third channel which has at most a third highest priority among all channels with at least one started output audio stream and which has been started as the last output audio stream among the at least one started output audio stream of the third channel is output at a zero volume.

5. The method according to claim 1, wherein the electronic assistance device manages, in a last-in first-out (LIFO) stack, all started output audio streams associated exclusively with a respective channel out of two or more channels of the electronic assistance device.

6. The method according to claim 1, wherein the first output audio stream is received from a backend of the first assistance application arranged on an external network.

7. An electronic assistance device comprising a processor and a non-transitory computer-readable memory having processor-executable instructions stored thereon, wherein the processor-executable instructions, when executed by the processor, facilitate:
executing a voice-controlled first assistance application exclusively accepting a first wake-up word and providing a first output audio stream;
executing a voice-controlled second assistance application different from the voice-controlled first assistance application, the voice-controlled second assistance application exclusively accepting a second wake-up word and providing a second output audio stream;
outputting, via a loudspeaker, the first output audio stream and the second output audio stream;
continuously detecting, via a microphone, an ambient sound and providing the detected ambient sound as an input audio stream;
recognizing the first wake-up word and the second wake-up word in a user's voice input recognized in the provided input audio stream; and
recognizing in the recognized user's voice input a command word accepted by the voice-controlled first assistance application and by the voice-controlled second assistance application.

8. The electronic assistance device according to claim 7, wherein the processor-executable instructions, when executed by the processor, further comprises:
defining two or more channels having different priorities and each comprising a plurality of output audio streams associated exclusively with a respective channel.

9. The electronic assistance device according to claim 8, wherein each defined channel comprises a plurality of similar output audio streams.

10. The electronic assistance device according to claim 8, wherein the two or more channels comprise four channels comprising a dialogue channel having a highest priority, a telephony channel having a second highest priority, an event channel having a second lowest priority, and a content channel having a lowest priority.

11. The electronic assistance device according to claim 8, wherein each defined channel has a defined command group having command words accepted by the voice-controlled first assistance application and by the voice-controlled second assistance application.

12. The electronic assistance device according to claim 8, wherein each output audio stream corresponds to a defined transition table which associates with each possible state of a respective output audio stream one or more command words compatible with such state.

13. The electronic assistance device according to claim 7, wherein the processor-executable instructions, when executed by the processor, further facilitate:

receiving the first an output audio stream from a backend of the voice-controlled first assistance application arranged on an external network.

14. A non-transitory computer-readable medium having processor-executable instructions stored thereon for operating an electronic assistance device, wherein the processor-executable instructions, when executed, facilitate:
- executing a voice-controlled first assistance application exclusively accepting a first wake-up word and providing a first output audio stream;
- executing a voice-controlled second assistance application different from the voice-controlled first assistance application, the voice-controlled second assistance application exclusively accepting a second wake-up word and providing a second output audio stream;
- outputting, via a loudspeaker, the first output audio stream and the second output audio stream;
- continuously detecting, via a microphone, an ambient sound and providing the detected ambient sound as an input audio stream;
- recognizing the first wake-up word and the second wake-up word in a user's voice input recognized in the provided input audio stream; and
- recognizing in the recognized voice input a command word accepted by the first assistance application and by the second assistance application.

* * * * *